(12) United States Patent
Huberts et al.

(10) Patent No.: US 9,541,052 B2
(45) Date of Patent: Jan. 10, 2017

(54) MISFIRE DETECTION USING ION CURRENT INTEGRATION AND RPM ADAPTATION

(71) Applicant: FORD GLOBAL TECHNOLOGIES, LLC, Dearborn, MI (US)

(72) Inventors: Garlan J. Huberts, Millford, MI (US); Qiuping Qu, Troy, MI (US); Chris P. Glugla, Macomb, MI (US); Ameen Al-Khafaji, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 351 days.

(21) Appl. No.: 14/458,356

(22) Filed: Aug. 13, 2014

(65) Prior Publication Data

US 2016/0047353 A1 Feb. 18, 2016

(51) Int. Cl.
| | | |
|---|---|---|
| *F02P 5/00* | (2006.01) | |
| *F02P 17/12* | (2006.01) | |
| *G01M 15/11* | (2006.01) | |
| *F02D 41/22* | (2006.01) | |
| *F02D 35/02* | (2006.01) | |

(52) U.S. Cl.
CPC .............. *F02P 17/12* (2013.01); *G01M 15/11* (2013.01); *F02D 35/021* (2013.01); *F02D 41/22* (2013.01); *F02P 2017/128* (2013.01)

(58) Field of Classification Search
CPC ........... F02P 5/1455; F02P 5/00; F02P 5/1514; F02P 3/045; F02P 3/0853
USPC .......................... 123/406.11, 406.13, 406.14, 406.37, 123/406.39, 606, 609, 630, 479; 324/459, 392, 324/388, 399
See application file for complete search history.

(56) References Cited

U.S. PATENT DOCUMENTS

| | | | |
|---|---|---|---|
| 5,215,067 A | 6/1993 | Shimasaki et al. | |
| 6,104,195 A | 8/2000 | Yoshinaga et al. | |
| 6,615,811 B1 | 9/2003 | Butler, Jr. | |
| 2004/0083794 A1* | 5/2004 | Daniels ............ | F01L 1/08 73/35.08 |
| 2004/0084034 A1* | 5/2004 | Huberts ............ | F02M 26/01 123/630 |
| 2004/0084035 A1* | 5/2004 | Newton ............ | F02M 26/01 123/630 |
| 2004/0085068 A1* | 5/2004 | Zhu ................. | F01N 3/2006 324/382 |
| 2004/0085070 A1* | 5/2004 | Daniels ............ | F02M 26/01 324/391 |
| 2005/0046278 A1* | 3/2005 | Long ............... | F02P 3/0453 307/10.1 |

(Continued)

*Primary Examiner* — John Kwon
(74) *Attorney, Agent, or Firm* — Gregory P. Brown; MacMillan, Sobanski & Todd, LLC

(57) ABSTRACT

An ignition system controlled by a powertrain controller via a dwell line carrying a dwell signal has a state machine to monitor a dwell period between consecutive dwell signals and to adjust a rate of a variable clock signal accordingly. A multi-bit counter is clocked by the adjusted clock signal. The counter has a first set of bits to establish an integration period and a second set of bits coupled to a resistive ladder generating a stair step signal. A current sensor provides a current signal proportional to the ion current. A comparator compares the current signal to the stair step signal. An ion current counter is incremented during the integration period whenever the current signal indicates an ion current magnitude greater than the stair step signal. The accumulated count at the end of the integration period is reported to the powertrain controller as a measure of the ion current.

19 Claims, 6 Drawing Sheets

(56) References Cited

U.S. PATENT DOCUMENTS

2007/0186903 A1\* 8/2007 Zhu ...................... F01N 3/2006
123/406.37

\* cited by examiner

MISFIRE DETECTION USING ION CURRENT INTEGRATION AND RPM ADAPTATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to detecting misfires in internal combustion engines for automotive vehicles, and, more specifically, to a circuit and method for integrating ion current to detect misfires.

Automobiles employ catalytic converters to reduce the amount of pollutants in the engine exhaust. However, when a cylinder misfires so that no combustion or incomplete combustion occurs, uncombusted fuel is introduced into the exhaust which burns in the hot catalytic converter. The heat from fuel burning in the catalytic converter destroys the catalyst. Thus, it becomes desirable to detect and count engine misfires and to inform the operator of the vehicle upon occurrence of excessive misfires so that steps may be taken to protect the catalytic converter. Gasoline turbocharged direct injection (GTDI) engines can be especially vulnerable to misfires at high loads and RPM.

It is also desirable to detect misfires in order to allow adaptive control of the combustion engine in order to improve engine performance or to possibly eliminate the condition leading to misfire or remove fuel to the misfiring cylinder and thereby protect the engine. The identity of a misfiring cylinder and the frequency of misfires is typically recorded for later use during diagnosis and repair of the vehicle.

It is known to monitor crankshaft acceleration in order to detect misfires, but known methods can be ineffective for hybrid electrics vehicles and for vehicles with dual mass flywheels, for example.

Another method for detecting misfires monitors an ion current flowing across a spark plug after occurrence of an ignition spark. The more complete the combustion, the greater the conductance of the combustion products and the greater the ion current that flows. Integrating the area under the ion current signal for a certain amount of crank angle degrees after spark is considered to be a reliable indicator of misfire and late burns, but conventional implementations have been expensive and require an extra signal wire to connect each ignition coil directly to the powertrain control module (PCM), additional analog-to-digital converter inputs in the PCM microprocessor, and software to integrate the area under the ion current curve in real time. It would be desirable to integrate the ion current in a manner that requires no additional inputs to the PCM and minimizes the need for any additional software (e.g., for integrating the ion current).

SUMMARY OF THE INVENTION

In one aspect of the invention, an ignition system is controlled by a powertrain controller via a dwell line carrying a dwell signal to charge an inductive ignition coil. A state machine in an ignition coil interface monitors a dwell period between consecutive dwell signals and adjusts a rate of a variable clock signal according to the dwell period. A multi-bit counter is clocked by the adjusted clock signal. The counter has a first set of bits used by the state machine to establish an integration period and a second set of bits coupled to a resistive ladder generating a stair step signal having a plurality of cycles during the integration period. A current sensor provides a current signal proportional to the ion current. A comparator compares the current signal to the stair step signal. An ion current counter is incremented during the integration period whenever the current signal indicates an ion current magnitude greater than the stair step signal. The accumulated count at the end of the integration period is reported to the powertrain controller as a measure of the ion current (a low count being indicative of misfire).

DETAILED DESCRIPTION OF PREFERRED EMBODIMENTS

Figure 1:
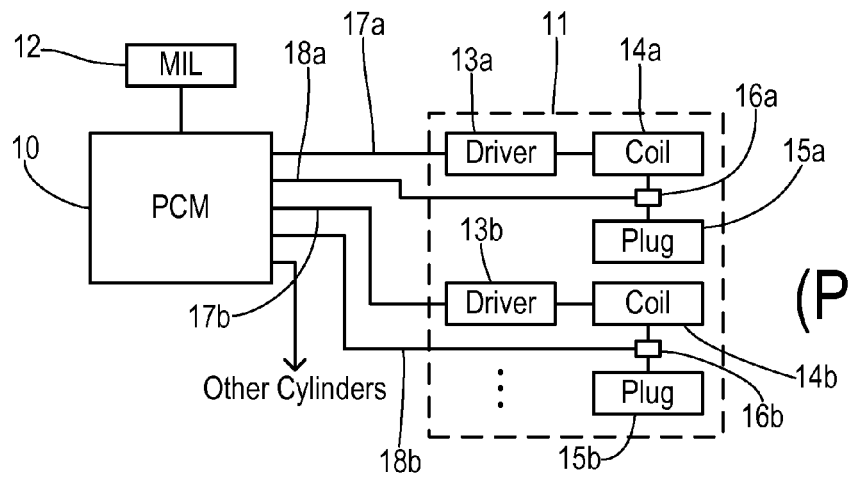
FIG. 1 is a block diagram showing a powertrain controller and ignition system for a combustion engine.

Referring to FIG. 1, a powertrain control module (PCM) 10 is coupled to an ignition system 11. A typical function of PCM 10 is to detect misfires, and when misfires are detected then to take a mitigating action such as illuminating a malfunction indicator light (MIL) 12 or modifying engine operation to reduce or eliminate the misfiring. Ignition system 11 is shown as a coil-on-plug (COP) system with individual coils connected to the respective spark plugs for each cylinder. Details of the COP ignition system for two of the cylinders are shown. For a first cylinder, a driver 13a, a coil 14a, and a spark plug 15a are arranged to generate an ignition spark in the conventional manner. A current sensor 16a is arranged (together with appropriate circuitry in driver 13a) for creating and monitoring an ion current across spark plug 15a after the initial spark event. Each additional cylinder requires the same ignition components, such as a driver 13b, a coil 14b, a spark plug 15b, and a current sensor 16b as shown for the second cylinder.

A dwell line 17a provides a dwell command from PCM 10 to driver 13a. Additional dwell lines such as line 17b provide respective dwell commands to the other cylinders. A measured current signal is provided from sensor 16a to PCM 10 over a dedicated sensor line 18a. The conventional use of ion current to detect misfire has required PCM 10 to accommodate a current sensor input for each cylinder in addition to added software for characterizing and integrating the ion currents, resulting in significant added costs.

Figure 2:
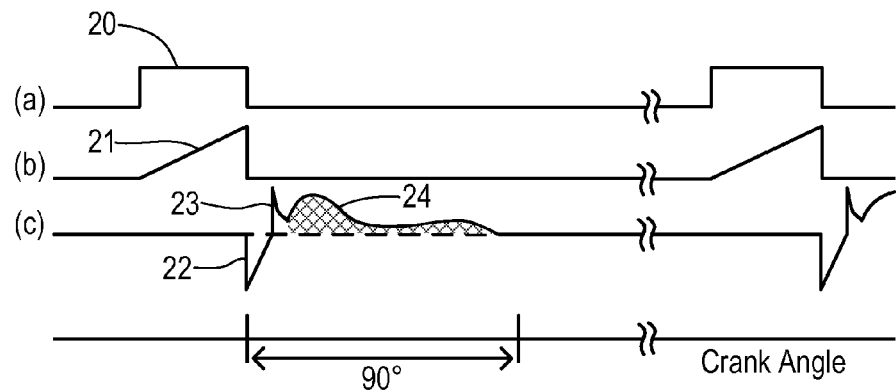
FIG. 2 is a waveform diagram showing a relationship between a dwell command signal, a primary current, and a secondary current.

The use of ion current for detecting misfires is further explained in connection with FIG. 2. FIG. 2(a), a dwell command 20 is generated on the dwell line by the PCM. When dwell command 20 has a high level, the ignition coil primary winding is energized by the driver resulting in a ramping up of current shown at 21 in FIG. 2(b). At the end of the dwell command 20 (i.e., when it transitions back to a low level), the primary winding is turned off and an ignition spark occurs in the spark plug. A high voltage and current are induced in the secondary coil and applied to the spark plug. After the spark occurs, a predetermined voltage is driven across the spark plug so that an ion current will be generated that has a magnitude indicative of the level of combustion that occurred. FIG. 2(c) shows a negative current 22 associated with the spark. At the end of the spark, a positive current spike 23 is caused by ring-out of residual energy in the ignition coil. Spike 23 may coincide with and mask an initial portion of ion current 24. The flow of ion current 24 over a predetermined amount of crankshaft rotation is known to be related to the quality of the ignition event. By integrating a crosshatched area under ion current curve 24, the ignition quality (e.g., a ratio of combusted to uncontested fuel) can be obtained. If the fuel is uncombusted, then the ion current is low and a misfire is detected.

Figure 3:
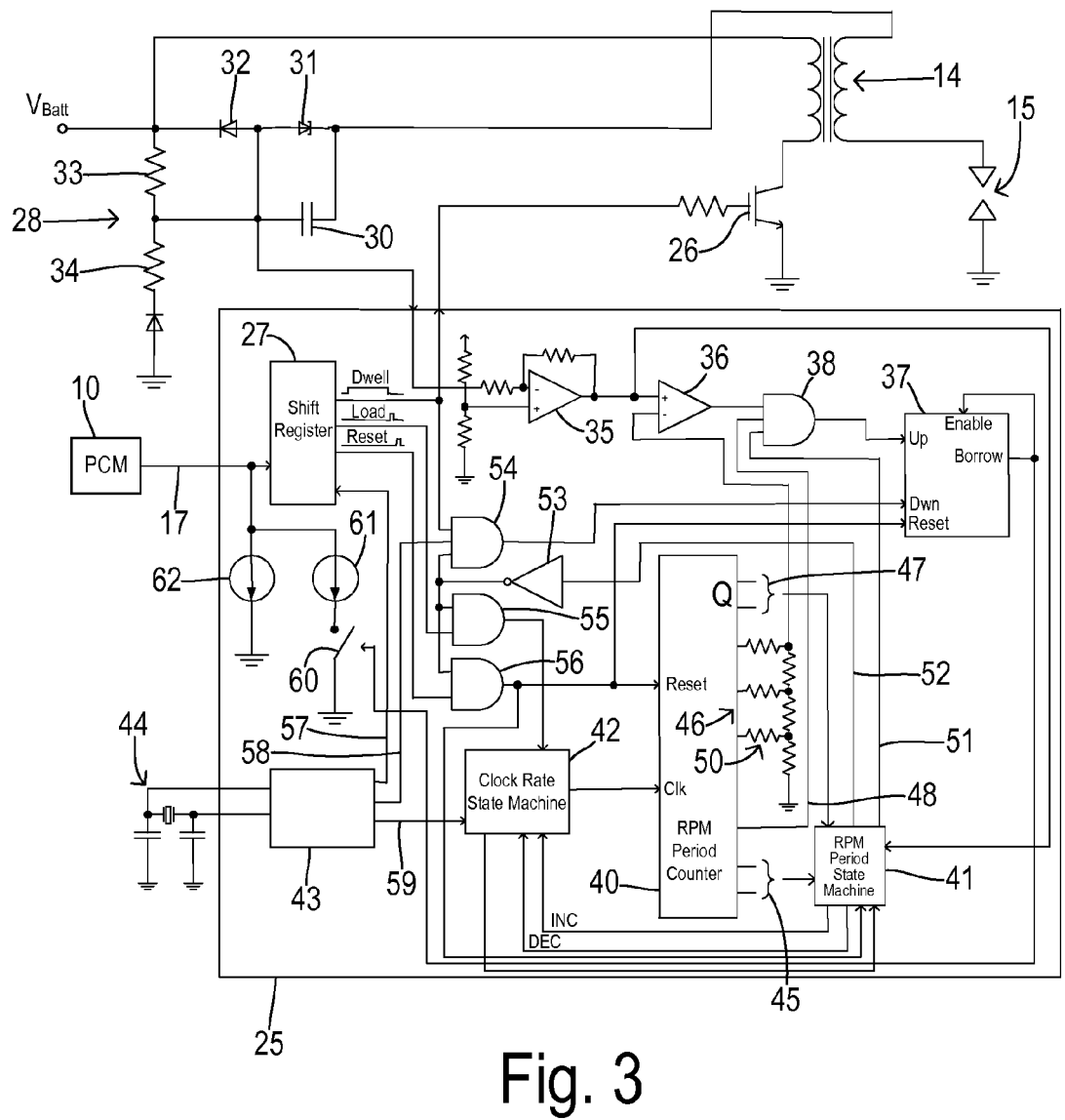
FIG. 3 is a schematic diagram showing one preferred embodiment of an ignition circuit and an ignition interface in greater detail.

FIG. 3 shows an embodiment of the invention wherein an ignition interface circuit 25 is coupled between PCM 10 and a primary switch 26 which drives the primary coil of ignition coil 14. A shift register 27 in interface circuit 25 receives the dwell commands via dwell line 17. A dwell signal from shift register 27 is coupled to the input of switch 26 as a conditioned dwell command to drive switch 26.

An ion current generator and sensor circuit 28 is coupled to the secondary winding of ignition coil 14. A capacitor 30 becomes charged during a spark event to a predetermined voltage determined by a zener diode 31 (which is in parallel with capacitor 30) and a feedforward diode 32 that couples capacitor 30 to battery voltage $V_{batt}$. After the spark event ends, the predetermined voltage stored on capacitor 30 drives the ion current through spark plug 15 via the secondary winding and a resistor 34. A voltage appearing at the junction between resistors 33 and 34 is proportional to the ion current.

The junction of resistors 33 and 34 is connected to one input of an op amp 35 which isolates the measured ion current signal, and then provides it to a noninverting input of a comparator 36. The output of comparator 36 is coupled to an UP input of an up/down integration counter 37 via a transmission AND-gate 38. As described in more detail below, counter 37 accumulates a count corresponding to the integrated ion current.

An RPM period counter 40 is used to ensure that the ion current integration occurs over a predetermined amount of crankshaft rotation. It operates in conjunction with a state machine comprised of an RPM period state machine 41 and a clock rate state machine 42. A fixed clock reference 43 is coupled to a crystal circuit 44 to generate fixed time references for various elements of interface circuit 25 as will be explained below.

RPM period counter 40 is a multi-bit counter that has a plurality of output bits Q which are arranged in respective groups 45, 46, and 47. Groups 45, 46, and 47 may be overlapping (i.e., use some of the same output bits Q). In general, group 45 is comprised of lesser significant bits than group 46, and group 46 is comprised of bits of lesser significant bits than group 47. In addition, one particular bit is coupled via a line 48 to one input of an AND-gate 38.

The first group of bits 45 from RPM counter 40 is coupled to state machine 41. A resistive ladder 50 is coupled to second group of bits 46, with an output of resistive ladder 50 being coupled to the inverting input of comparator 36. Third group of bits 47 is coupled to state machine 41. State machine 41 generates an integration period which is output on a line 51 which is coupled to another input of AND-gate 38. State machine 41 generates an "ignore dwell edge" signal which is coupled over an output line 52 to an input of an inverter 53. Inverter 53 has its output connected to respective inputs of AND-gates 54, 55, and 56. The "ignore dwell edge" signal is low except when very short dwell intervals are detected (e.g. during a re-strike operation). Thus, AND-gates 54-56 act as transmission gates which transmit their other input signals as long as a short dwell interval is not occurring.

Time reference 43 provides respective fixed clock frequencies from its outputs 57, 58, and 59 to shift register 27, AND-gate 54, and clock rate state machine 42, respectively. In operation, shift register 27 eliminates small noise glitches in the dwell command received over dwell line 17 in order to supply a qualified dwell command to switch 26 and to AND-gate 54. A trailing edge of the dwell command initiates a sequence of events from shift register 27 including a load pulse and a reset pulse. The load pulse is provided via AND-gate 55 to an input of clock rate state machine 42. The reset pulse is provided via AND-gate 56 to RPM period counter 40, RPM period state machine 41, and up/down counter 37.

RPM period counter 40 generates a count from the trailing edge of one dwell event to the trailing edge of the next dwell event (e.g., between reset pulses). Since it is desired to integrate the ion current over approximately a crank angle of 90°, it is desired to keep a total count that is reached between reset pulses (e.g., corresponding to 720°) within a reasonable range over the complete operating speed range of the engine. To accomplish this, RPM period state machine 41 adjusts the counting rate of clock rate state machine 42 so that the total count accumulated by RPM period counter 40 stays within a predetermined range. More specifically, group of bits 47 is examined at the trailing edge of dwell and if it is out of the predetermined range, then either an increment signal (INC) or decrement signal (DEC) are provided from state machine 41 to state machine 42. More specifically, the INC signal may be high during count values in state machine 41 below a first threshold and is otherwise low. The DEC signal may be high during count values in state machine 41 above a second (higher) threshold and is otherwise low. When the load pulse occurs, clock rate state machine 42 inspects the INC and DEC signals and accordingly updates the counting frequency it uses to generate the clock pulses that it applies to a CLK input of RPM period counter 40.

As a result of the above operation, RPM period counter 40 counts at a rate proportional to engine speed. The second group of bits 46 have a chosen magnitude within the counting cycle so that the sequential activation of the resistors within resistive ladder 50 generates a stair step signal which is provided to the inverting input of comparator 36. Second group of bits 46 excludes the most significant bits so that the resulting stair step signal repeats through a plurality of cycles during each integration period that is signaled by state machine 41 on line 51. Step sizes in the stair step signal are determined by the resistor values in the resistive ladder, which may preferably follow a linear increase. Alternatively, nonlinear steps could be generated by resistive ladder 50 in order to emphasize either low or high current levels. In particular, a logarithmic scale for the stair step may have certain advantages.

During each renewed cycle of the stair step signal, comparator 36 generates a high output level until the magnitude of the stair step signal exceeds the magnitude of the ion current signal. During the portion of each stair step signal in which the ion current is greatest, counter 37 counts up (i.e., increments its accumulated count). Upon completion of all the cycles of the stair step signal, counter 37 will have accumulated a count proportional to the integral of the ion current. The counting rate for counter 37 is determined by the rate of a single bit of RPM period counter 40 that is connected to AND-gate 38 via an output line 48.

The accumulated count corresponding to the ion current integral is reported back to PCM 10 during the subsequent dwell command in the following manner. Dwell line 17 is coupled to ground through a current sink 62 and through a series combination of a switch 60 and a current sink 61. Up/down counter 37 has a Borrow output connected to turn switch 60 on and off. When dwell line 17 is driven to a high-voltage by PCM 10 during a dwell command, a variable amount of current is sunk from dwell line 17 depending on the state of switch 60. With switch 60 closed, both current sinks 61 and 62 are active so that a first current magnitude is drawn from dwell line 17. With switch 60 open, a second current smaller than the first current is drawn since only current sink 62 is active. PCM 10 is configured to detect the level of current being sunk from dwell line 17. As explained below, the time of switching of the variable current sink level is used to inform PCM 10 of the value of the accumulated count stored in counter 37.

Preferably, switch 60 is normally closed so that the higher current sink level is active at the beginning of a dwell command from PCM 10. At the beginning of a dwell command, counter 37 contains the integrated ion current count and the Borrow output is at a low level. Also during the dwell command, a fixed clock signal from clock reference circuit 43 is coupled through AND-gate 54 from line 58 to the Down input of counter 37. Counter 37 counts down at the fixed rate until it reaches zero, at which time the Borrow output transitions to a high level, thereby turning off switch 60 after an amount of time that is proportional to the magnitude of the integration count that was obtained during the previous dwell command PCM 10 monitors the amount of time between the beginning of a dwell command and the switching of the current sink in order to determine the count value that had been accumulated in counter 37. PCM 10 then compares this time to a threshold in order to detect whether misfire has occurred. It should be noted that the clock rate for counting down the ion current counter is not the same as the rate that it was counted up, since the rate for counting up is variable according to the engine RPM.

Figure 4:
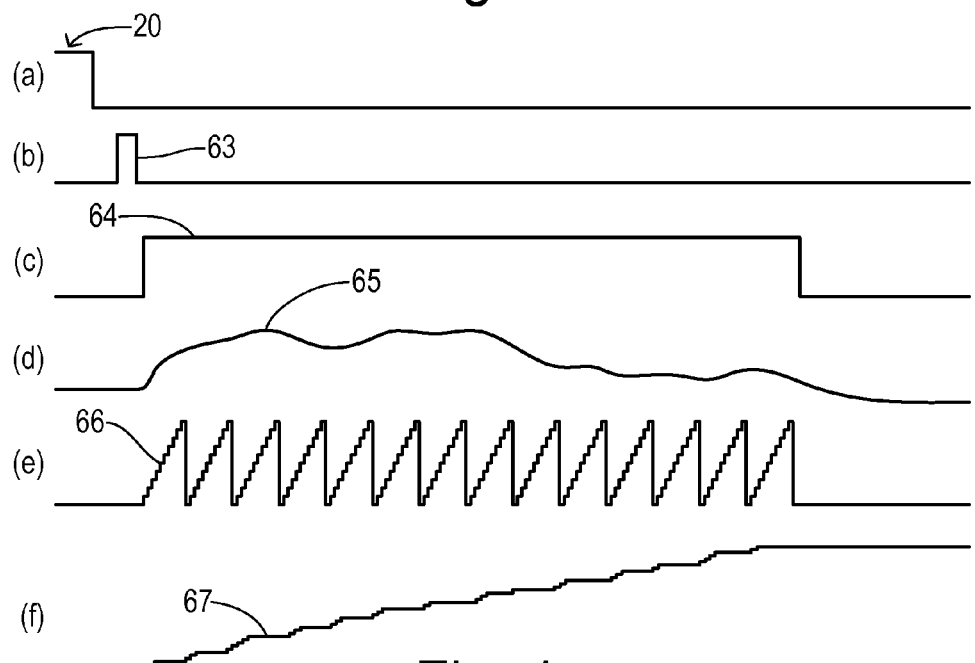
FIG. 4 is a waveform diagram showing signals relating to integration of an ion current.

FIG. 4 shows the state of various signals within the interface circuit of FIG. 3 during the detection and reporting of misfire. FIG. 4(a) shows a falling edge of dwell command 20. After a fixed time determined by the shift register, a pulse 63 (which can be the reset pulse or the load pulse described above) is generated as shown in FIG. 4(b). FIG. 4(c) shows the integration period 64 which is triggered by pulse 63 and persists for a time or a count determined by the RPM state machine. FIG. 4(d) shows ion current 65 after being inverted by the op amp. FIG. 4(e) shows stair step signal 66 which ramps between zero and a maximum value during each stair step cycle. FIG. 4(f) shows the accumulated count in the up/down counter which increments during each stair step cycle until the stair step exceeds the ion current and then maintains the current value until the next cycle of the stair step signal.

Figure 5:
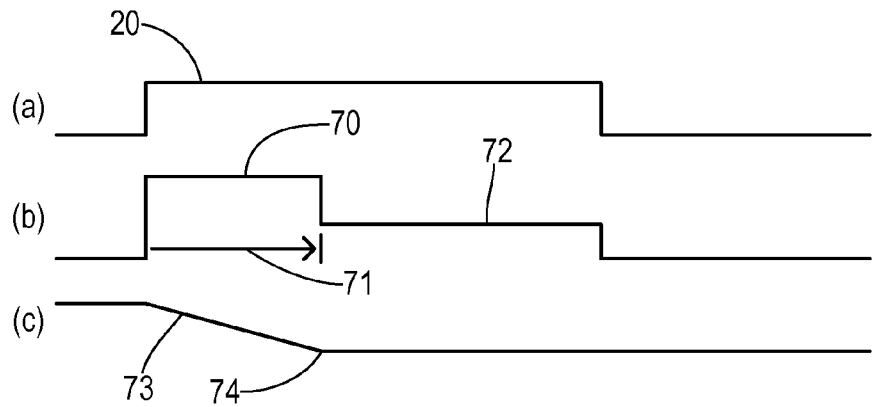
FIG. 5 is a waveform diagram showing variable current sinking of the dwell command to provide a feedback signal from the ignition interface to the powertrain controller.

FIG. 5 shows the use of variable current sinking to report an accumulated ion current count to the PCM. From the beginning of dwell command 20 in FIG. 5(a), a first level of current sink is present during a countdown window 71 as shown in FIG. 5(b). FIG. 5(c) shows the contents of the up/down counter which ramps down along a segment 73 until reaching a count of zero at 74. At the time that a zero count is reached, the current sink in FIG. 5(b) drops to a second level at 72 and stays there until the end of dwell command 20.

Figure 6:
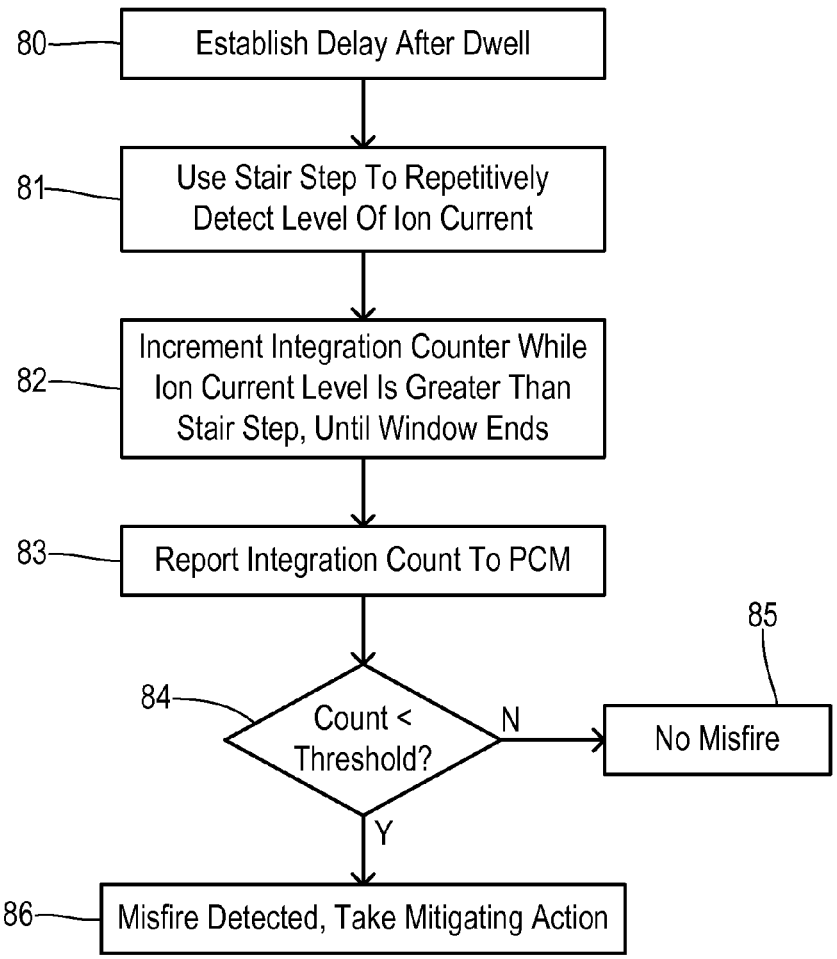
FIG. 6 is a flowchart showing one preferred method of the invention for detecting misfires.

FIG. 6 shows one preferred method of the invention wherein a predetermined delay is established after the end of a dwell command in step 80 in order to wait until the actual spark event has subsided. The delay may also include the time during which a ring-out current spike occurs, as will be explained below. Using stored energy from the spark event, an ion current is generated across the spark plug in order to characterize the level of combustion that was obtained. In step 81, the stair step signal is used to repetitively detect the instantaneous level of the ion current. An integration counter is incremented in step 82 during times that the ion current level is greater than the stair step. Counting continues until the integration window ends. After the end of the integration window, during the next dwell command, the value in the integration counter is reported to the PCM in step 83. In step 84, the PCM checks to determine whether the integration count is less than a threshold. If the count is not less than a threshold then the absence of a misfire is noted in step 85. If the count is less than the threshold, then a misfire is detected in step 86 and the PCM takes mitigating action such as informing the driver via a malfunction indicator light or by shutting off fuel to a misfiring cylinder.

Figure 7:
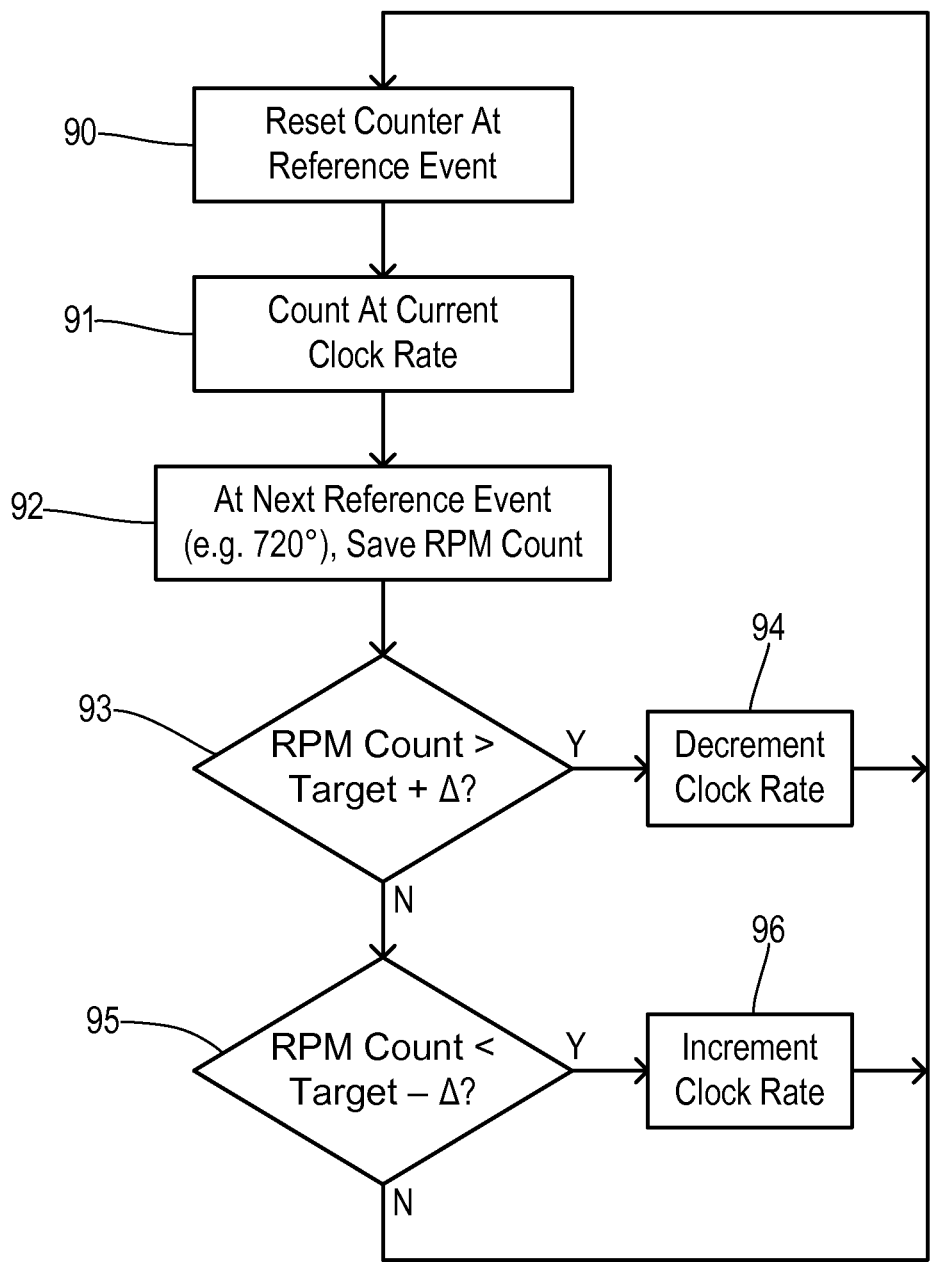
FIG. 7 is a flowchart showing one preferred method for adjusting a clock signal to provide a reference for integrating an ion current.

A preferred method for updating the RPM state machine in order to match the integration period to the operating speed of the engine is shown in FIG. 7. The RPM counter is reset in step 90 in response to a reference event such as the trailing edge of a dwell command. The RPM period counter counts up from zero at a current clock rate in step 91 until the occurrence of at a next reference event in step 92. Then the value of the RPM count is saved. The next reference event may, for example, occur after 720° of engine rotation in response to the next dwell command for the same particular cylinder. In step 93, a check is performed to determine whether the RPM count is greater than a target count plus an offset A. If so, then the clock rate for counting the RPM count is decremented in step 94 and a return is made to step 90. If the check in step 93 is negative, then a check is performed in step 95 to determine whether the RPM count is less than the target count minus the offset A. If so, then the RPM counting clock rate is incremented in step 96 and a return is made to step 90. If the check in step 95 is negative, then a return is made to step 90 without changing the clock rate.

Figure 8:
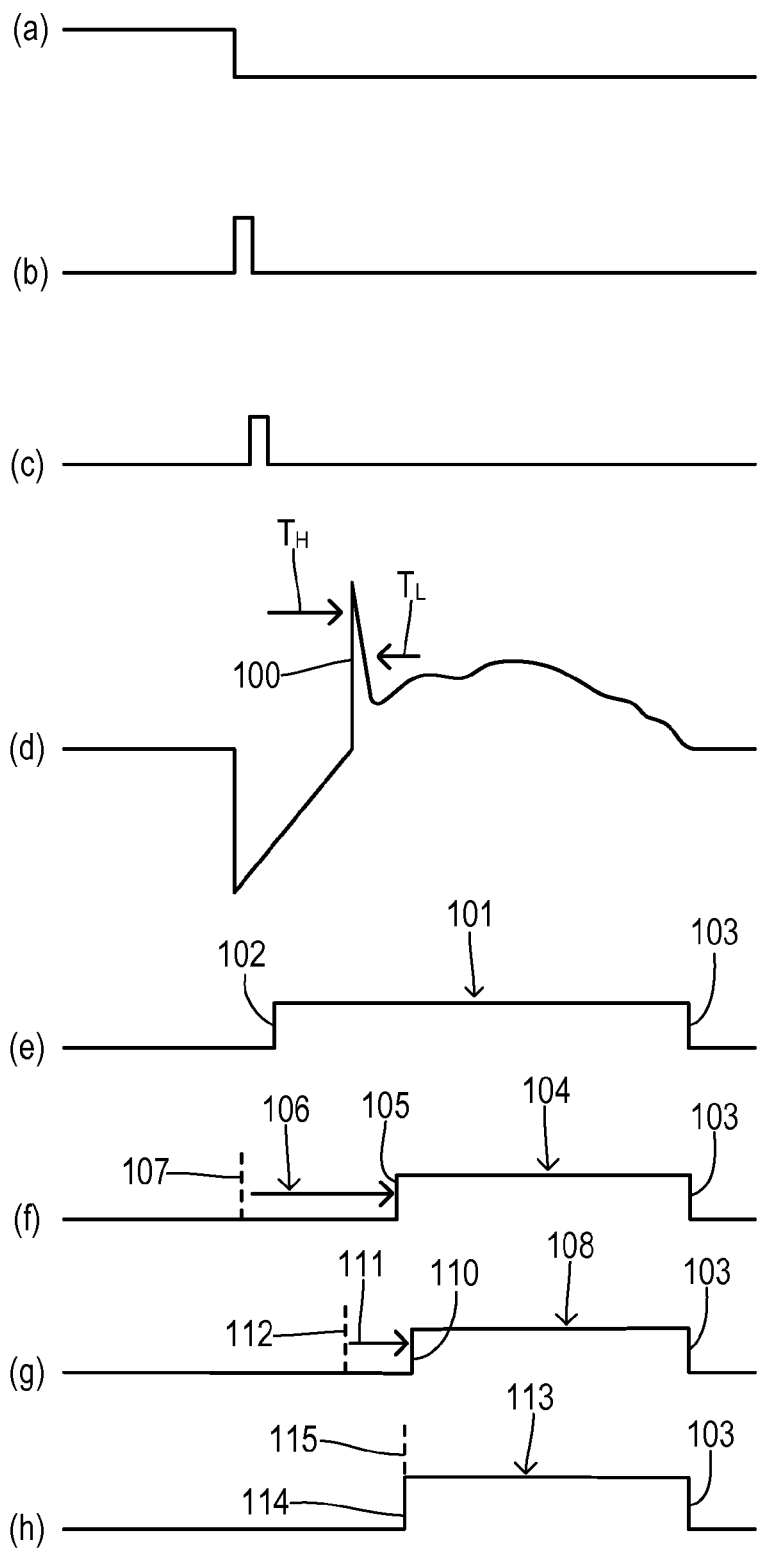
FIG. 8 is a waveform diagram showing four methods of adapting for a ringout current spike at the end of spark.

As mentioned above, the spark current and subsequent ring out current spike are present during an initial time following the end of a dwell signal. As shown in FIG. 8, a falling edge of a dwell command signal in FIG. 8(a) causes the shift register to produce a reset pulse in FIG. 8(b) and a load pulse in FIG. 8(c). FIG. 8(d) shows the secondary current, including a ring-out current spike 100.

In order to obtain a best estimate of an integrated ion current, it would be desirable to exclude the spark current and the ring-out current spike from the integrated ion current value. The measuring circuit can exclude spark current by producing a zero voltage in response to negative current. With regard to the current spike, four different embodiments for removing the current spike from the integrated current are illustrated in connection with FIGS. 8(e)-(h).

In a first embodiment in FIG. 8(e), an integration period 101 begins at 102 after the dwell signal (e.g., at the reset pulse or the load pulse). The current spike that is included within the ion current integration in this embodiment may be removed from the integrated current by the PCM by maintaining an estimated value for the integrated current spike. The estimate can be measured for the current engine operating conditions based on the fact that the ring-out current spike occurs whether or not fuel is injected into the cylinder. Thus, during engine coasting when a fuel injector is turned off (known as a "decel fuel off" event), instead of using the integrated current to detect misfire it can be used to characterize the ring-out current spike.

Figure 9:
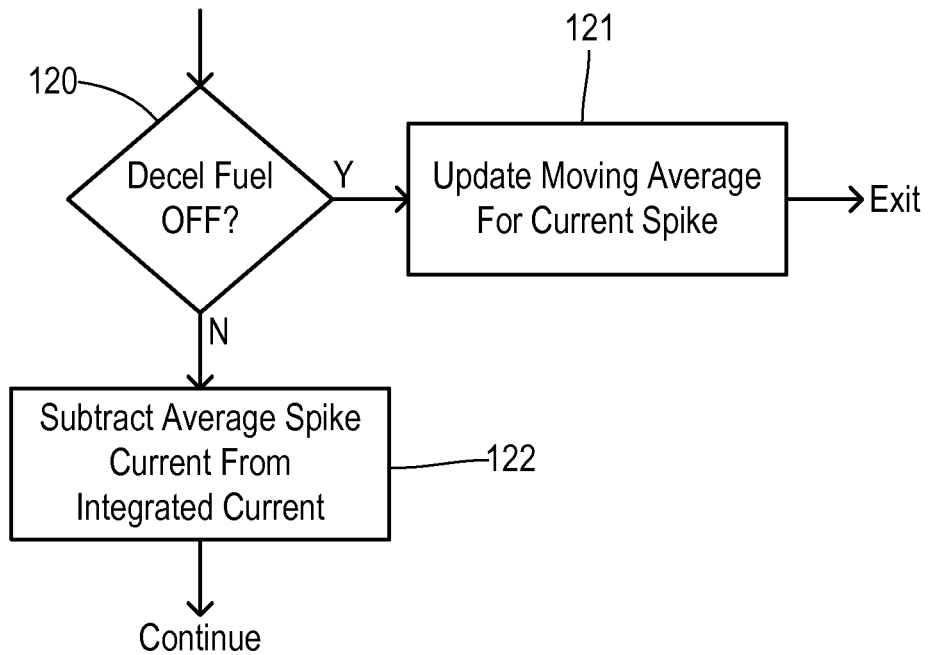
FIG. 9 is a flowchart showing one preferred method to detect the magnitude of the ringout current spike during decels.

As shown in FIG. 9, the PCM is configured to maintain a current spike integration value for each cylinder to be subtracted from actual firing events in order to remove the ring-out spike contribution. In step 120, the PCM checks to determine whether the fuel is turned off during the time of the dwell command. If fuel was off, then the PCM updates a moving average for the current spike in step 121. Since fuel was off and there was no combustion, the integrated current value received from the interface circuit has no ion current contribution and represents only the current spike associated with the spark. The integrated current values for decal fuel off events can be averaged using a finite impulse response (FIR) filter, for example. If step 120 determines that the fuel was not shut off (i.e., a normal combustion event should have occurred), then the PCM subtracts the moving average of the integrated current spikes from the integrated ion current value for the present combustion event. The PCM then continues in a known manner, using the resulting ion current value to detect a misfire without any errors resulting from the current spike.

Figure 10:
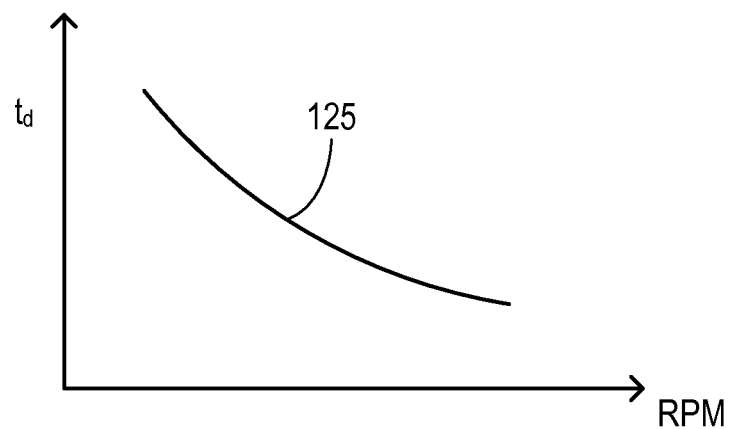
FIG. 10 shows an example of the delay time from end of dwell to the start of the integration period vs. RPM.

In the second embodiment shown in FIG. 8(f), an integration period 104 begins at a rising edge 105 which is triggered after a variable delay 106 following the end of dwell at 107. Delay 106 can be empirically derived in advance according to a typical amount of time required for the spark current and ring out current spike to complete. The duration of these events typically depends on engine RPM and other factors. As shown in FIG. 10, a variable delay $t_d$ may be determined according to a predetermined relationship 125 between delay time $t_d$ and engine RPM. Notably, as RPM increases the delay time $t_d$ decreases. Since the delay for determining the start of an integration period is preferably measured according to real time, RPM period state machine 41 in FIG. 3 may have a direct connection with clock rate state machine 42 to receive a selected clock rate for measuring the variable delay.

In the third embodiment of FIG. 8(g), an integration period 108 has a rising edge 110 occurring at a fixed delay 111 after the beginning of the ring-out spike at 112. As shown in FIG. 8(d), a high threshold $T_H$ may be used for comparing with secondary current 100 in order to detect the beginning of the ring-out spike. Thus, a connection is provided between the output of op amp 35 and RPM period state machine 41 (FIG. 3). State machine 41 would include a comparator (not shown) to compare the instantaneous secondary current from op amp 35 with high threshold $T_H$. Fixed delay 111 is configured to correspond to a typical duration of the ring-out spike.

FIG. 8(h) shows a fourth embodiment wherein an integration period 113 begins at a rising edge 114 which is triggered by detection of the ring-out spike as follows. First, the beginning of a spike is detected using the high threshold $T_H$ as described above. Then the magnitude of the secondary current continues to be monitored until it falls below a lower threshold $T_L$ which is selected to be greater than the typical early magnitude of the ion current. For this embodiment, state machine 41 would include two comparators, each comparing the secondary current with the respective high and low thresholds.

Each integration period ends with a falling edge 103, which may preferably occur at a predetermined crankshaft angle as described earlier.

What is claimed is:

1. An ignition system controlled by a powertrain controller via a dwell line carrying a dwell signal, comprising:
a state machine monitoring a dwell period between consecutive dwell signals and adjusting a rate of a variable clock signal according to the dwell period;
a multi-bit counter clocked by the adjusted clock signal, the counter having a first set of bits used by the state machine to establish an integration period, and a second set of bits coupled to a resistive ladder generating a stair step signal having a plurality of cycles during the integration period;
a current sensor providing a current signal proportional to the ion current;
a comparator comparing the current signal to the stair step signal;
an ion current counter incremented during the integration period whenever the current signal indicates an ion current magnitude greater than the stair step signal, wherein an accumulated count at the end of the integration period is reported to the powertrain controller as a measure of the ion current.

2. The ignition system of claim 1 wherein the state machine is comprised of a clock rate state machine configurable to generate the clock signal at any one of a plurality of predetermined frequencies, and an RPM period state machine responsive to the multi-bit counter to accumulate a dwell-to-dwell count during the dwell period, wherein the RPM period state machine generates a control signal provided to the clock rate state machine to select one of the plurality of frequencies in response to the dwell-to-dwell count.

3. The ignition system of claim 1 wherein the resistive ladder provides a plurality of linear resistance steps.

4. The ignition system of claim 1 wherein the resistive ladder provides a plurality of nonlinear resistance steps.

5. The ignition system of claim 1 further comprising a variable current sink coupled to the dwell line, wherein the accumulated count is reported to the powertrain controller by altering the variable current sink from a first current to a second current at a time determined in response to the accumulated count.

6. The ignition system of claim 5 wherein the ion current counter is counted down during a particular dwell signal from the accumulated count that was accumulated after an end of a prior dwell signal, and wherein the current sink switches from the first current to the second current when the ion current counter reaches zero.

7. The ignition system of claim 1 wherein the beginning of the integration period occurs at a predetermined time after the dwell signal.

8. The ignition system of claim 7 wherein the predetermined time is proportional to a speed of an engine coupled to the ignition system.

9. The ignition system of claim 1 wherein the beginning of the integration period occurs at a predetermined time after onset of a ring-out spike in the current signal.

10. The ignition system of claim 1 wherein the beginning of the integration period occurs after a ring-out spike in the current signal detected in response to the current signal first exceeding a high threshold and then falling below a low threshold.

11. A method of detecting misfires in an ignition system of a combustion engine, comprising:
  repetitively comparing a stair step signal with a sensed ion current during an integration window;
  accumulating a count during times when the sensed ion current has a magnitude greater than the stair step signal; and
  comparing the accumulated count to a threshold to detect whether a misfire occurred.

12. The method of claim 11 wherein the stair step signal is comprised of a plurality of cycles during the integration window.

13. The method of claim 11 further comprising the steps of:
  reporting the accumulated count after the integration window ends to a powertrain controller; and
  taking a mitigating action in response to detection of the misfire.

14. The method of claim 13 wherein a dwell line couples the powertrain controller to the ignition system, wherein the ignition system includes a variable current sink coupled to the dwell line, and wherein the reporting step is comprised of altering the variable current sink from a first current to a second current at a time determined in response to the accumulated count.

15. A system for determining misfire of an ignition system in a combustion engine, the system comprising:
  an ignition coil for an ignition system, the ignition coil including a primary winding and a secondary winding;
  a spark plug connected to a high voltage terminal of the secondary winding;
  a battery connected to a low voltage terminal of the secondary winding;
  a feed-forward diode with sensing resistor network connected between the low voltage terminal and the battery providing an ion current signal;
  a controller configured to provide a dwell command on a control wire of an ignition system; and
  an ignition interface comprising:
    a state machine monitoring a dwell period between consecutive dwell commands and adjusting a rate of a variable clock signal according to the dwell period;
    a multi-bit counter clocked by the adjusted clock signal, the counter having a first set of bits used by the state machine to establish an integration period, and a second set of bits coupled to a resistive ladder generating a stair step signal having a plurality of cycles during the integration period;
    a comparator coupled to the resistor network to compare the ion current signal to the stair step signal;
    an ion current counter incremented during the integration period whenever the ion current signal is greater than the stair step signal, wherein the ion current counter is decremented during a subsequent dwell command from an accumulated count obtained at the end of the integration period; and
    a current sink connected between the control wire and ground to sink current during the dwell command, wherein a first current is sinked while the ion current counter is decrementing from the accumulated count until the ion current counter reaches zero and then a second current is sinked;
  wherein the controller detects a misfire in response to a time duration that the current sink is sinking the first current.

16. The system of claim 15 wherein the beginning of the integration period occurs at a predetermined time after the dwell command.

17. The system of claim 16 wherein the predetermined time is proportional to a speed of the engine.

18. The system of claim 15 wherein the beginning of the integration period occurs at a predetermined time after onset of a ring-out spike in the current signal.

19. The system of claim 15 wherein the beginning of the integration period occurs after a ring-out spike in the current signal detected in response to the current signal first exceeding a high threshold and then falling below a low threshold.

* * * * *